J. B. LYONS.
Curd Cutter.
No. 42,209.  Patented April 5, 1864.
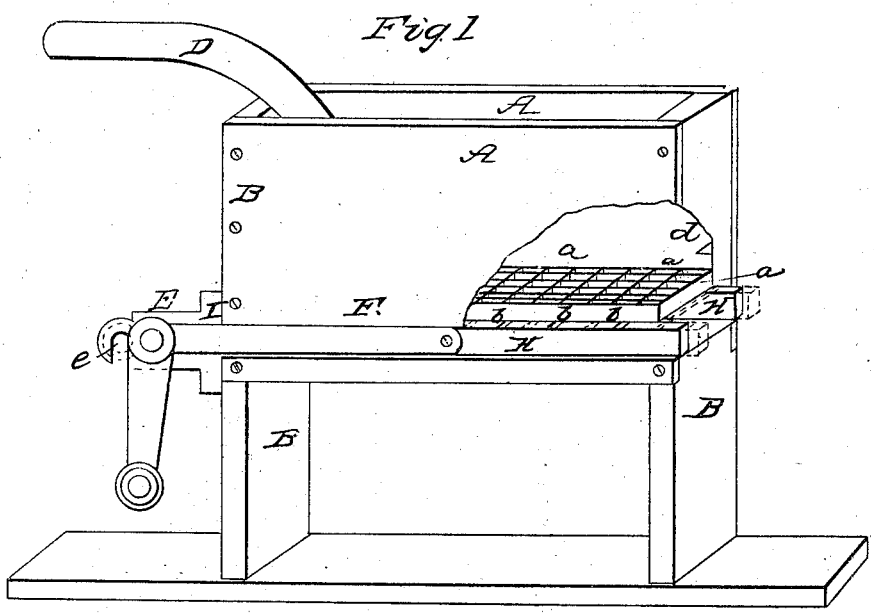
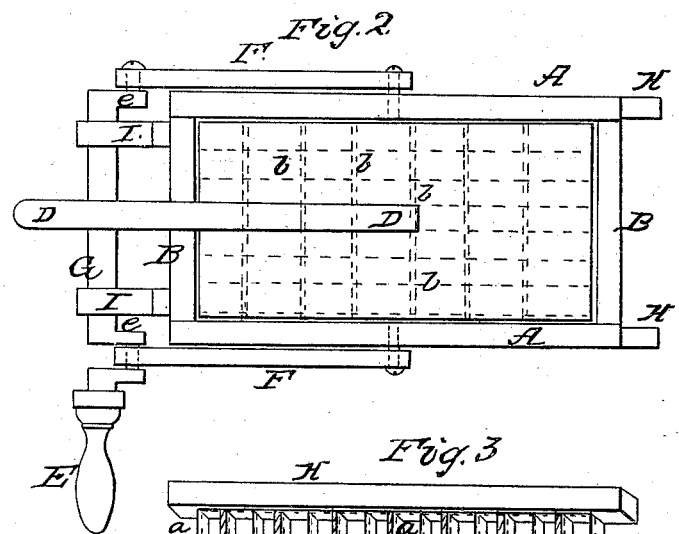
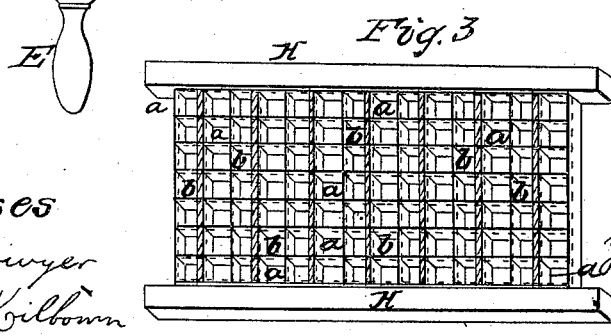
Witnesses
Thomas Dwyer
Dwight C. Kilbourn
Inventor
James B. Lyons

UNITED STATES PATENT OFFICE.

JAMES B. LYONS, OF MILTON, CONNECTICUT.

IMPROVEMENT IN CURD-CUTTERS.

Specification forming part of Letters Patent No. 42,209, dated April 5, 1864.

*To all whom it may concern:*

Be it known that I, JAMES B. LYONS, of Milton, in the town and county of Litchfield, in the State of Connecticut, have invented a new and useful Machine for Cutting and Preparing Cheese-Curd, and the following is a full, clear, and exact description of the same, reference being had to the accompanying drawings, making a part of this specification, in which—

Figure 1 represents a side elevation, showing the operating parts in dotted lines. Fig. 2 shows a plan or top view, the right-angle cutters represented in red lines. Fig. 3 is a detached view of the stationary and sliding cutters.

My invention consists in the combination of the stationary and vibrating cutters and compressor or hand-follower.

To enable others skilled in the art to make and use my invention, I will describe its construction and operation more in detail, referring to the drawings and to the letters of reference marked thereon.

I make a square or oblong box, A A, of any desired size to accommodate the dairy or the size or quantity of the curd used for a cheese. the ends of the box B B forming the standards or supports for the machine, which may be placed and operated in a tub, pan, or box to receive the curd as it is liberated by the cutters. A part of the cutting apparatus (as seen in Figs. 3 and 2, red lines) may be made of thick sheet-tin, the edges notched so that it fits together in squares of about half of an inch space, the top and bottom surfaces forming a plane, on the top of which is placed the curd, over which is a hand-follower, C D, made to fit in and cover the surface of the squares or cutters a a a which form the bottom of the box A A. The follower C D is operated by the handle D', one end being placed under the bracket d, and, as it forces the curd through the stationary cutters a a a a, the vibrating cutters b b b b b, being placed close to the under side of the stationary cutters a a a, are made to operate laterally by the action of the crank E, the cranks or eccentrics e e, and coupling-bars F F, connected to the slides H H.

The vibrating cutters b b may be made of narrow strips of sheet tin or wire, screwed to the sliding rods H H in such a manner that they will be kept straight and slice off the curd as it is being forced through the network or stationary cutters a a a. The crankshaft G may be supported in the boxes I I, the same being secured to the end of the machine in a line with the vibrating cutters.

To operate the machine the curd is placed in the box A A, the follower C D placed in position to force it down at the same time by turning the crank E. The cutters b b b, working laterally will slice off from the squares made by the stationary cutters a a a, and thus reduce into cubes a half an inch square the curd, and when thus sliced up it is in most excellent condition to scald, salt, and prepare for the press.

The advantages of this machine for cutting up cheese curd over the old process of "chopping" will readily be seen, for the work is done in a far superior manner, in less than one fourth of the time or labor that is required when the old "cheese-curd chopping-knife" is used.

Having thus fully described my simple and efficient invention, what I claim as new and useful, and desire to secure by Letters Patent, is—

The vibrating cutters b b b b, in combination with the stationary right angle cutters a a a a, and the compressor or hand-follower C D, operating substantially in the manner as and for the purposes herein set forth.

JAMES B. LYONS. [L. S.]

Witnesses:
THOMAS DWYER,
DWIGHT C. KILBOURN.